(12) United States Patent
Yokota (10) Patent No.: US 7,492,520 B2
(45) Date of Patent: Feb. 17, 2009

(54) LIGHT SOURCE APPARATUS AND DISPLAY APPARATUS

(75) Inventor: Kazuhiro Yokota, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/758,364

(22) Filed: Jun. 5, 2007

(65) Prior Publication Data

US 2007/0291368 A1 Dec. 20, 2007

(30) Foreign Application Priority Data

Jun. 16, 2006 (JP) ............................ P2006-167762

(51) Int. Cl.
*G02B 13/20* (2006.01)
*G02B 5/02* (2006.01)

(52) U.S. Cl. ................... 359/599; 359/831; 362/620; 362/627

(58) Field of Classification Search ................ 359/599, 359/707, 431, 831–837
See application file for complete search history.

(56) References Cited

U.S. PATENT DOCUMENTS

| | | | | |
|---|---|---|---|---|
| 6,011,602 | A * | 1/2000 | Miyashita et al. ............. | 349/65 |
| 6,746,130 | B2 * | 6/2004 | Ohkawa ...................... | 362/617 |
| 7,153,017 | B2 * | 12/2006 | Yamashita et al. .......... | 362/606 |
| 7,401,962 | B2 * | 7/2008 | Yamashita et al. .......... | 362/606 |
| 2002/0041441 | A1 * | 4/2002 | Wang ........................ | 359/599 |
| 2006/0274244 | A1 * | 12/2006 | Battiato et al. .............. | 349/119 |
| 2007/0223249 | A1 * | 9/2007 | Lee et al. .................... | 362/613 |

FOREIGN PATENT DOCUMENTS

JP 10-253807 9/1998

* cited by examiner

*Primary Examiner*—Thong Nguyen
(74) *Attorney, Agent, or Firm*—Bell, Boyd & Lloyd LLP (57) ABSTRACT

A light source apparatus is provided. The light source apparatus includes: a light-emitting portion; a light-guiding plate having the light-emitting portion disposed at a side surface thereof, light beams being emitted from a top surface of the light-guiding plate; and a light path converting sheet above the light-guiding plate, formed of a prism sheet including cylindrical prisms, a cross-section of which is an isosceles triangle. Each of the prisms includes a light incidence plane that forms a first equilateral constituting an apex angle of the isosceles triangle, a reflection plane that forms a base of the isosceles triangle and a light exit plane that forms a second equilateral constituting the apex angle of the isosceles triangle The prism is disposed such that the light incidence plane is approximately perpendicular to a direction of light beams with highest luminous intensity among the light beams emitted from the top surface of the light-guiding plate.

3 Claims, 5 Drawing Sheets

LIGHT SOURCE APPARATUS AND DISPLAY APPARATUS

CROSS REFERENCES TO RELATED APPLICATIONS

The present application claims priority to Japanese Patent Application JP 2006-167762 filed in the Japanese Patent Office on Jun. 16, 2006, the entire contents of which being incorporated herein by reference.

BACKGROUND

The present disclosure relates to a light source apparatus including a light-emitting diode or the like as a light source thereof and relates to a display apparatus including a light source apparatus for illuminating a display portion from the back side.

Recently, thin display apparatuses such as a liquid-crystal display apparatus and a plasma display have been proposed and put into practical use.

In particular, liquid-crystal display apparatuses using liquid-crystal display panels can be driven with low power consumption, and large liquid-crystal display panels can be manufactured at low cost. Accordingly, those liquid-crystal display apparatuses have been used widely, and technological research and development thereof have been made.

Such light-emitting display apparatuses typically employ a backlight system using a backlight apparatus in which a whole surface of a light transmissive liquid-crystal display panel including a color filter is illuminated with light from the back side to display color images.

An Edge-light system and a direct system are typically employed as the structures for the backlight apparatus.

In the edge-light system, a light source (light-emitting diode or fluorescent lamp) emits light toward the end surface of a light-guiding plate provided to the lower surface of a light-diffusing plate from a direction perpendicular to the illuminating direction, thereby obtaining a surface light source.

In the direct system, a light source (light-emitting diode or fluorescent lamp) provided in matrix shape directly under the light diffusing plate emits light in the direction vertical to the light diffusing plate.

Since liquid-crystal display apparatuses may require improved brightness, backlight apparatuses may also require improved brightness.

Japanese Unexamined Patent Application Publication No. H10-253807, for example, discloses an edge-light system including a light transmissive film with a prism attached thereto in order to improve brightness.

Since light obliquely emitted from a light exit plane of a light-guiding plate can be brought close to the normal direction of the light exit plane by providing the light transmissive film with the prism attached as described above, the brightness of light in the normal direction of the light exit plane can be increased.

However, according to Japanese Unexamined Patent Application Publication No. H10-253807, the prism is disposed such that light is refracted at boundary surfaces, when light emitted from the light-guiding plate is incident on the prism on the light transmissive film and when light outgoes from the prism, respectively. When light is refracted at the boundary surfaces of the prism, light is not only refracted but also reflected on the boundary surfaces of the prism and returns. Therefore, an amount of light is reduced to the extent of the reflected light.

With such light loss, brightness improvement may be prevented.

It is desirable to provide a light source apparatus in which brightness can be improved and to provide a display apparatus including the light source apparatus.

SUMMARY

According to an embodiment of the present invention, there is provided a light source apparatus including a light-emitting portion, a light-guiding plate having the light-emitting portion disposed at a side surface thereof, light beams being emitted from a top surface of the light-guiding plate, and a light path converting sheet above the light-guiding plate, formed of a prism sheet including cylindrical prisms cross-section of which is an isosceles triangle. Each of the prisms on the prism sheet includes a light incidence plane that forms a first equilateral constituting an apex angle of the isosceles triangle, a reflection plane that forms a base of the isosceles triangle and a light exit plane that forms a second equilateral constituting the apex angle of the isosceles triangle. The prism is disposed such that the light incidence plane is approximately perpendicular to a direction of light beams with highest luminous intensity among the light beams emitted from the top surface of the light-guiding plate.

According to another embodiment, there is provided a light source apparatus including a light-emitting portion, a light-guiding plate having the light-emitting portion disposed at a side surface thereof, light beams being emitted from a top surface of the light-guiding plate, and a light path converting sheet above the light-guiding plate, formed of a prism sheet including cylindrical prisms cross-section of which is a polygon obtained by deforming an isosceles triangle. Each of the prisms on the prism sheet includes at least a first light incidence plane that forms a first equilateral constituting an apex angle of the isosceles triangle, a first reflection plane that forms a base of the isosceles triangle, a second light incidence plane that forms one side of the polygon, a second reflection plane that forms another side of the polygon and a light exit plane that forms a second equilateral constituting the apex angle of the isosceles triangle. An angle formed with the second reflection plane and the light exit plane is equal to an angle formed with the second reflection plane and the second light incidence plane. The prism is disposed such that the first light incidence plane is approximately perpendicular to a direction of light beams with highest luminous intensity and that the second light incidence plane is approximately perpendicular to a direction of light beams with second highest luminous intensity, among the light beams emitted from the top surface of the light-guiding plate. Further, a display apparatus according to another embodiment of the present invention includes a display unit for displaying images and a light source apparatus having an arrangement of the light source apparatus according to another embodiment and illuminating the display unit from the back side.

Additional features and advantages are described herein, and will be apparent from, the following Detailed Description and the figures.

DETAILED DESCRIPTION

Embodiments are described below in detail with reference to the drawings.

According to an embodiment of the present invention, there is provided a light source apparatus including a light-emitting portion, a light-guiding plate having the light-emitting portion disposed at a side surface thereof, light beams being emitted from a top surface of the light-guiding plate, and a light path converting sheet above the light-guiding plate, formed of a prism sheet including cylindrical prisms cross-section of which is an isosceles triangle. Each of the prisms on the prism sheet includes a light incidence plane that forms a first equilateral constituting an apex angle of the isosceles triangle, a reflection plane that forms a base of the isosceles triangle and a light exit plane that forms a second equilateral constituting the apex angle of the isosceles triangle. The prism is disposed such that the light incidence plane is approximately perpendicular to a direction of light beams with highest luminous intensity among the light beams emitted from the top surface of the light-guiding plate.

Further, a display apparatus according to an embodiment includes a display unit for displaying images and a light source apparatus having an arrangement of the light source apparatus according to an embodiment of the present invention and illuminating the display unit from the back side.

With the above-mentioned arrangement of the light source apparatus according to an embodiment, the cross-section of the prism on the prism sheet is the isosceles triangle and the prism includes the light incidence plane that forms the first equilateral constituting the apex angle of the isosceles triangle, the reflection plane that forms the base of the isosceles triangle and the light exit plane that forms the second equilateral constituting the apex angle of the isosceles triangle. The prism is disposed such that the light incidence plane of the isosceles triangle is approximately perpendicular to a direction of light beams with highest luminous intensity among the light beams emitted from the top surface of the light-guiding plate. As a result, light beams with the highest luminous intensity among the light beams emitted from the top surface of the light-guiding plate are incident on the light incidence plane approximately perpendicularly, reflected on the reflection plane, and incident on the light exit plane approximately perpendicularly.

Accordingly, since the direction of the light beams with the highest luminous intensity is approximately perpendicular to the light incidence plane and to the light exit plane, light loss on the respective planes can be reduced greatly Therefore an amount of light loss can be controlled. Since an amount of light loss (on the light incidence plane and light exit plane), in particular, reflection loss can be controlled, brightness of light emitted from the light source apparatus through the prism sheet can be improved.

Further, in the above-mentioned light source apparatus according to an embodiment, the light incidence plane that forms one side of the isosceles triangle which shows the cross-section of the prism is disposed perpendicularly to the direction of light with the highest luminous intensity, corresponding to angular intensity distribution of light emitted from the light-guiding plate. Therefore, light loss on the light incidence plane can be minimized.

Further, with the arrangement of the display apparatus according to an embodiment, since the light source apparatus for illuminating the display unit from the back side includes the arrangement of the light source apparatus according to an embodiment, brightness of light emitted from the light source apparatus can be improved. Hence, images may be displayed on the display unit with sufficient brightness.

According to another embodiment, there is provided a light source apparatus including a light-emitting portion, a light-guiding plate having the light-emitting portion disposed at a side surface thereof, light beams being emitted from a top surface of the light-guiding plate, and a light path converting sheet above the light-guiding plate, . formed of a prism sheet including cylindrical prisms cross-section of which is a polygon obtained by deforming an isosceles triangle. Each of the prisms on the prism sheet includes at least a first light incidence plane that forms a first equilateral constituting an apex angle of the isosceles triangle, a first reflection plane that forms a base of the isosceles triangle, a second light incidence plane that forms one side of the polygon, a second reflection plane that forms another side of the polygon and a light exit plane that forms a second equilateral constituting the apex angle of the isosceles triangle. An angle formed with the second reflection plane and the light exit plane is equal to an angle formed with the second reflection plane and the second light incidence plane. The prism is disposed such that the first light incidence plane is approximately perpendicular to a direction of light beams with highest luminous intensity and that the second light incidence plane is approximately perpendicular to a direction of light beams with second highest luminous intensity, among the light beams emitted from the top surface of the light-guiding plate. Further, a display apparatus according to another embodiment of the present invention includes a display unit for displaying images and a light source apparatus having an arrangement of the light source apparatus according to another embodiment and illuminating the display unit from the back side.

With the arrangement of the above-mentioned light source apparatus according to another embodiment described above, the cross-section of the prism on the prism sheet is the polygon obtained by deforming the isosceles triangle. The polygon includes at least the first light incidence plane that forms the first equilateral constituting the apex angle of the isosceles triangle, the first reflection plane that forms the base of the isosceles triangle, the second light incidence plane that forms one side of the polygon, the second reflection plane that forms another side of the polygon and the light exit plane that forms the second equilateral constituting the apex angle of the isosceles triangle. The angle formed with the second reflection plane and the light exit plane is equal to the angle formed with the second reflection plane and the second light incidence plane. The prism is disposed such that the first light incidence plane is approximately perpendicular to a direction of light beams with highest luminous intensity and that the second light incidence plane is approximately perpendicular to a direction of light beams with second highest luminous intensity, among the light beams emitted from the top surface of the light-guiding plate. The prism includes the first light incidence plane that forms the first equilateral constituting the apex angle of the isosceles triangle, the first reflection plane that forms the base of the isosceles triangle and the light exit plane that forms the second equilateral constituting the apex angle of the isosceles triangle. Since the prism is disposed such that the first light incidence plane of the polygon is approximately perpendicular to the direction of light with the highest luminous intensity among light beams emitted from the top surface of the light guiding plate, light beams with the highest luminous intensity among the emitted light beams are incident on the first light incidence plane approximately perpendicularly, reflected on the first reflection plane and incident on the light exit plane approximately perpendicularly. Accordingly, since the direction of the light beams with the highest luminous intensity is approximately perpendicular to the first light incidence plane and the light exit plane, light loss on the light incidence plane and on the light exit plane can be reduced greatly, thereby an amount of light loss being controlled. Also, the angle formed with the second reflection plane and the light exit plane is equal to the angle formed with the second reflection plane and the second light incidence plane, and the prism is disposed such that the second light incidence plane of the polygon is approximately perpendicular to the direction of light with the second highest luminous intensity. Therefore, the light beams with the second highest luminous intensity are incident on the second light incidence plane approximately perpendicularly, reflected on the second reflection plane and incident on the light exit plane approximately perpendicularly. Accordingly, since the direction of light with the second highest luminous intensity is approximately perpendicular to the second light incidence plane and the light exit plane, light loss on the respective planes can be reduced greatly, thereby an amount of light loss being controlled. Since an amount of light loss (on the light incidence plane and light exit plane), in particular, reflection loss can be controlled, brightness of light emitted from the light source apparatus through the prism sheet can be improved.

Further, with the arrangement of the display apparatus according to another embodiment, since the light source apparatus for illuminating the display unit from the back side includes the arrangement of the light source apparatus according to another embodiment, brightness of light emitted from the light source apparatus can be improved. Hence, images may be displayed on the display unit with sufficient brightness.

According to the above-mentioned embodiments, since the brightness of light emitted from the light source apparatus can be improved, brightness equal to that of the related-art arrangement can be obtained with less energy. Accordingly, power consumption by the light source apparatus can be reduced to save energy, and a product life of the light source apparatus can be made long.

In addition, images may be displayed on the display unit with sufficient brightness in the display apparatus according to the embodiments, and the images can be displayed with less energy as compared with the related art. Accordingly, power consumption by the display apparatus can be reduced to save energy, and a product life of the light source apparatus can be extended.

Figure 1:
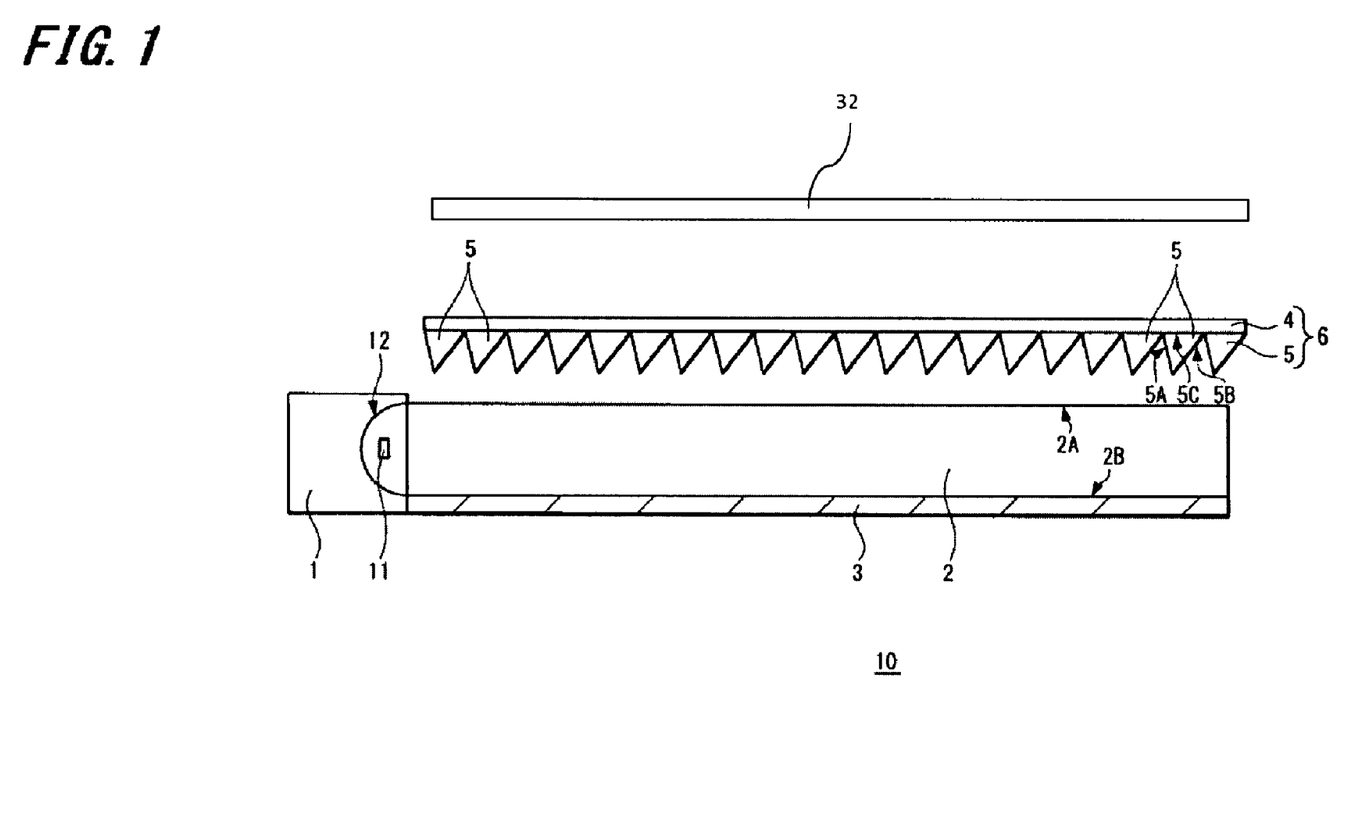
FIG. 1 is a schematic cross-sectional diagram of a light source apparatus according to an embodiment.

FIG. 1 is a schematic cross-sectional view showing a relevant part of a light source apparatus according to an embodiment. As shown in FIG. 1, a light source apparatus 10 includes a light-emitting portion 1 having a light-emitting diode (LED) 11 as a light source thereof and a light-guiding plate 2. The light-emitting portion 1 is attached to one side surface of the light-guiding plate 2. The light-emitting diode (LED) 11 is disposed on the right-hand side of the light-emitting portion 1 in FIG. 1 and light emitted from the light-emitting diode 11 is incident on the light-guiding plate 2. A reflection surface 12 such as a reflector is provided behind the light-emitting diode 11. It should be noted that instead of providing the reflection surface 12, a wall surface may be provided or nothing may be provided.

The light-guiding plate 2 is approximately a flat plate having a top surface 2A and a bottom surface 2B, which are principal planes. The light-guiding plate 2 is made of a transparent material (for example, transparent resin). Also, a reflective sheet 3 is provided at the side of the bottom surface 2B under the light-guiding plate 2. As a result, since light incident from the bottom surface 2B of the light-guiding plate 2 can be reflected upward and returned into the light-guiding plate 2, the light incident on the bottom surface 2B can be emitted from the top surface 2A of the light-guiding plate 2.

In addition, a prism sheet 6 having prisms 5 attached to the lower side of a transparent sheet 4 is provided above the top surface 2A of the light-guiding plate 2. The prism sheet 6 forms a light path converting sheet that converts the light path.

The transparent sheet 4 is disposed horizontally, that is, disposed in parallel to the top surface 2A of the light-guiding plate 2.

Each of the prisms 5 is a triangular pole and has a triangular cross-section. The longitudinal direction of the prism 5 is perpendicular to the sheet of drawing of FIG. 1, and one side of the triangle is attached to the transparent sheet 4.

The prisms 5 on the prism sheet 6 change the direction of light emitted from the top surface 2A of the light-guiding plate 2 so that light can be brought near the normal direction of the light exit plane of the light-guiding plate 2 and emitted from the prism sheet 6.

In addition, a light diffusing sheet or a light diffusing plate may be disposed above the transparent sheet 4 of the prism sheet 6 although not shown, whereby light passed through the prism sheet 6 is diffused so that luminance distribution and color distribution can be made uniform.

Figure 2:
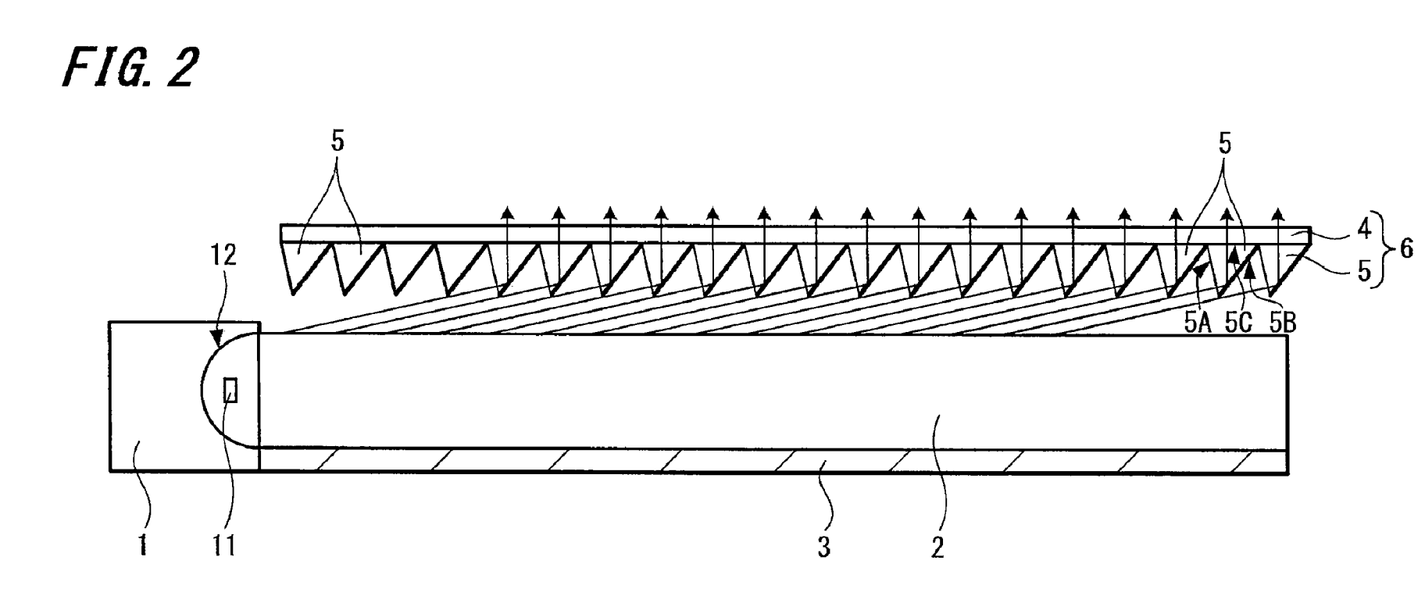
FIG. 2 is a diagram showing light paths of light beams that pass through a prism sheet shown in FIG. 1.

FIG. 2 shows light paths of light beams emitted from the top surface 2A of the light-guiding plate 2. Light is incident on the prism sheet 6, the direction thereof is changed and emitted from the prism sheet 6 as described above. As shown in FIG. 2, the light emitted from the top surface 2A of the light-guiding plate 2 is incident on a surface 5A of one side of the prism 5, reflected on a surface 5B of another side of the prism 5 and emitted from a top surface 5C of the prism 5.

Accordingly, the surface 5A of one side of the prism 5 is herein described as a light incidence plane, the surface 5B of another side of the prism 5 is herein described as a reflection plane and the top surface 5C of the prism 5 is herein described a light exit plane, respectively.

Intensity of light emitted from the top surface (light exit plane) 2A of the light-guiding plate 2 varies depending on the direction of outgoing light (depending on the angle inclined from the normal of the light exit plane). If the light source apparatus should be high in brightness as a surface light source of a backlight apparatus or the like, it may be necessary that the light source apparatus should be configured so as to most efficiently use light in the exit direction in which the maximum intensity is obtained.

The light source apparatus 10 according to the embodiment, in particular, includes the prisms 5, the cross-section of which is an isosceles triangle, on the prism sheet 6, and the respective surfaces (respective sides) 5A, 5B and 5C of each of the prisms 5 are disposed so as to correspond to the direction of light with the highest luminous intensity among light beams emitted from the top surface 2A of the light-guiding plate 2.

Figure 3A:
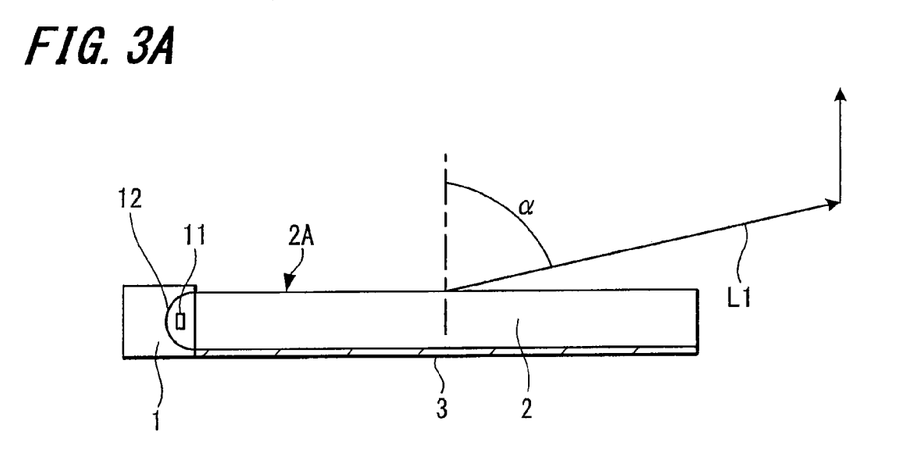
FIGS. 3A and 3B are diagrams showing an arrangement of respective surfaces of a prism shown in FIG. 1.
Figure 3B:
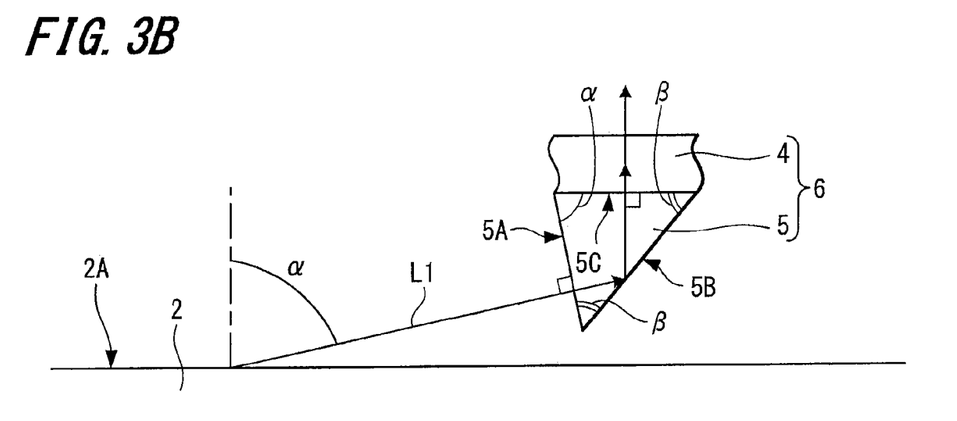

Specific arrangement of respective surfaces 5A, 5B and 5C of the prism 5 are described with reference to FIGS. 3A and 3B. As shown in FIG. 3A, a direction of light L1 with the highest luminous intensity among the light beams emitted from the top surface 2A of the light-guiding plate 2 forms an angle α with the normal direction of the top surface 2A. In this regard, as shown in FIG. 3B, if the light incidence plane 5A of the prism 5 is disposed so as to form the angle α with the transparent sheet 4 that is a horizontal plane, then the light L1 with the highest luminous intensity can be perpendicularly incident on the light incidence plane 5A of the prism 5.

Specifically, according to the embodiment, the light incidence plane 5A of the prism 5 is disposed so as to become perpendicular to the direction of the light L1 with the highest luminous intensity. The light incidence plane 5A forms the angle α with the transparent sheet 4 that is the horizontal plane. Further, the cross-section of the prism 5 is an isosceles triangle having the apex angle of the above-mentioned angle α. Here, an angle formed with the reflection plane 5B and the light incidence plane 5A and an angle formed with the reflection plane 5B and the light exit plane 5C are equal to each other, and the angle is represented by β as shown in FIG. 3B. A relationship between the angles α and β is represented by α+2β=π, and hence the following equation (1) is obtained.

$$\beta = (\pi - \alpha)/2 \qquad (1)$$

According to the above-mentioned arrangement of the respective surfaces, since the light L1 with the highest luminous intensity is reflected on the reflection plane 5B at the angle of incidence and reflection angle of π/2−β, reflected light is perpendicularly incident on the light exit plane 5C of the prism 5.

As shown in FIG. 3B, the light L1 with the highest luminous intensity is perpendicularly incident on the light incidence plane 5A of the prism 5, reflected on the reflection plane 5B of the prism 5 and perpendicularly incident on the light exit plane 5C of the prism 5. As a result, since the light L1 is not refracted at the boundary surfaces 5A and 5C of the prism 5 and light reflected on the boundary surfaces 5A and 5C is reduced greatly, an amount of light loss caused by the reflected light can be reduced and a sufficient amount of light can be emitted from the light exit plane 5C of the prism 5.

In order to set respective angles formed with the surfaces 5A, 5B and 5C of the prism 5 as described above, angular intensity distribution of light emitted from the top surface 2A of the light-guiding plate 2 is measured in advance, and the exit direction of light with maximum intensity is obtained for each light-guiding plate 2.

The above-mentioned light source apparatus 10 according to the embodiment includes the prism 5, the cross-section of which is the isosceles triangle, on the prism sheet 6, and the prism 5 includes the light incidence plane 5A that forms the equilateral constituting the apex angle of the isosceles triangle, the reflection plane 5B that forms the base of the isosceles triangle and the light exit plane 5C that forms the second equilateral constituting the apex angle of the isosceles triangle. The prism is disposed such that the light incidence plane 5A is perpendicular to the direction of the light L1 with the highest luminous intensity among the light beams emitted from the top surface 2A of the light-guiding plate 2.

Hence, the light L1 with the highest luminous intensity is perpendicularly incident on the incidence plane 5A, reflected on the reflection plane 5B, and then perpendicularly incident on the exit plane 5C.

Accordingly, since the light L1 with the highest luminous intensity is perpendicularly incident on the light incidence plane 5A and the light exit plane 5C, an amount of loss of incident light on the light incidence plane 5A and loss of light emitted from the light exit plane 5C can be reduced greatly, thereby the amount of light loss can be controlled.

Hence, an amount of light loss, in particular, loss of light reflected on the light incidence plane 5A and on the light exit plane 5C can be controlled, and therefore brightness of light emitted from the light source apparatus 10 through the prism sheet 6 can be improved.

Since brightness of light emitted from the light source apparatus 10 can be improved as described above, brightness equal to that of the related-art arrangement can be obtained using less energy.

Accordingly, power consumption by the light source apparatus 10 can be reduced to save energy, and a product life of the light source apparatus 10 can be extended.

It should be noted that, in the case where the direction of the light L1 emitted with the maximum intensity varies (that is, the angle α is not constant and the light L1 has an angular intensity distribution) in the light-guiding plate 2, the angles α and β of the respective prisms should be set corresponding to respective directions in which the light L1 is emitted. In such case, the direction of the light L1 emitted with the maximum intensity in an area near the light-emitting portion 1 is different from that in an area away from the light-emitting portion 1 in the light-guiding plate 2. Accordingly, the direction of the light L1 emitted with the maximum intensity may be changed in response to the distance from the light-emitting portion 1.

Respective surfaces of the prism 5 on the prism sheet 6 are disposed corresponding to the direction of light with the highest luminous intensity in the above-mentioned embodiment. Here, if the cross-section of the prism is varied, respective surfaces can be disposed to correspond with the direction of light with second highest luminous intensity.

An embodiment in that case is described below.

Figure 4:
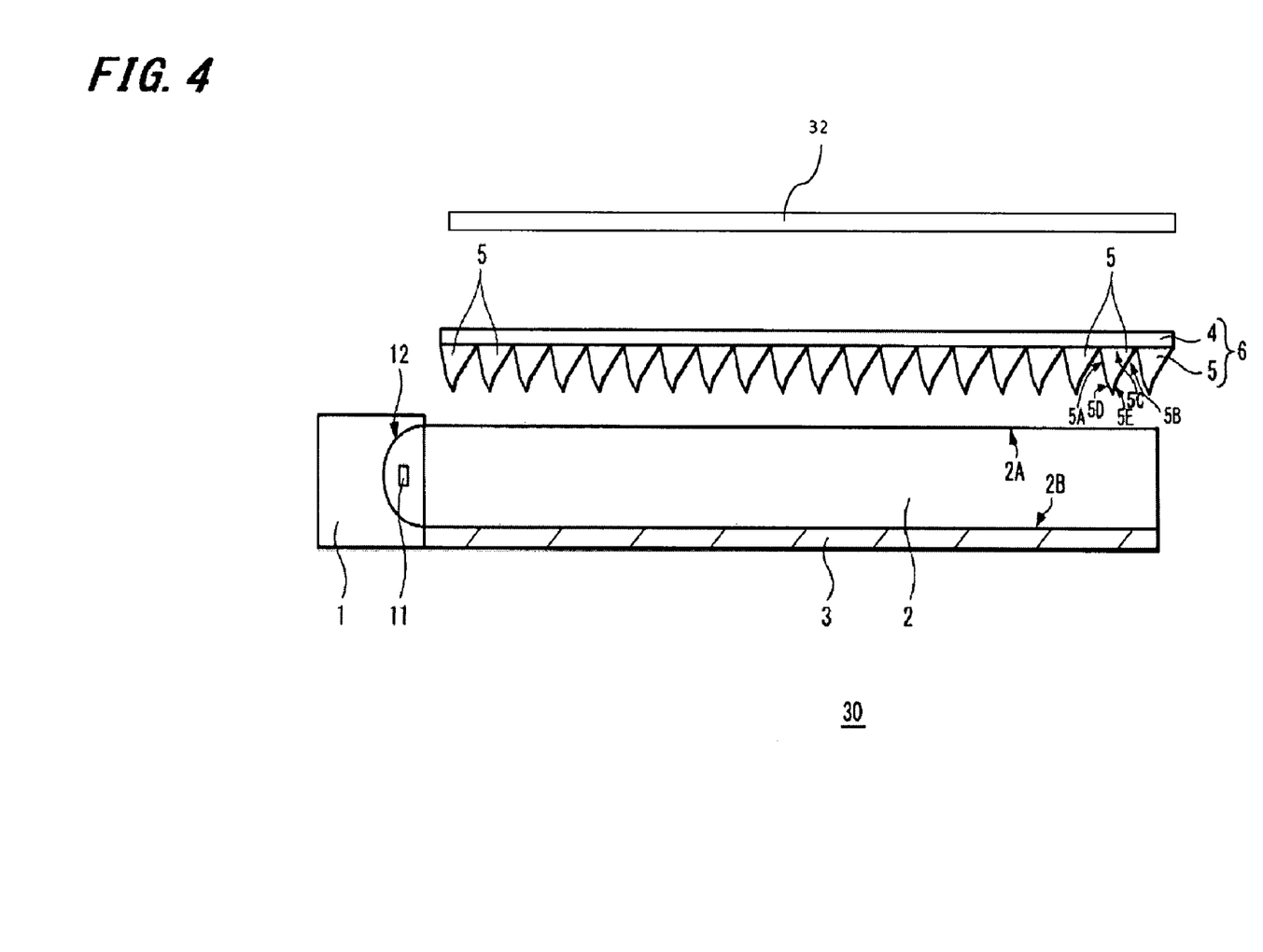
FIG. 4 is a schematic cross-sectional diagram of a light source apparatus according to another embodiment.

FIG. 4 is a schematic cross-sectional view of a relevant part of a light source apparatus according to another embodiment. As shown in FIG. 4, a light source apparatus 30 according to the embodiment includes the light-emitting portion 1 and the light-guiding plate 2 having arrangement similar to those of the light source apparatus 10 of the preceding embodiment shown in FIGS. 1 to 3 and further includes the prism sheet 6.

As shown in FIG. 4, the cross-section of the prism 5 on the prism sheet 6 in the light source apparatus 30 according to the embodiment is a pentagon obtained by deforming an isosceles triangle. The pentagon has such a shape as dented in the right-hand side as shown in FIG. 4. The pentagon showing the cross-section of the prism 5 includes two surfaces of a second light incidence plane 5D and a second reflection plane 5E in addition to the three surfaces constituting an isosceles triangle similar to the isosceles triangle according to the preceding embodiment shown in FIGS. 1 to 3, that is, in addition to the first light incidence plane 5A, the first reflection plane 5B and the light exit plane 5C. The second light incidence plane 5D is a surface extending from the first light incidence plane 5A in a downward direction. The second reflection plane 5E is a surface extending from the first reflection plane 5B in a downward direction.

Figure 5A:
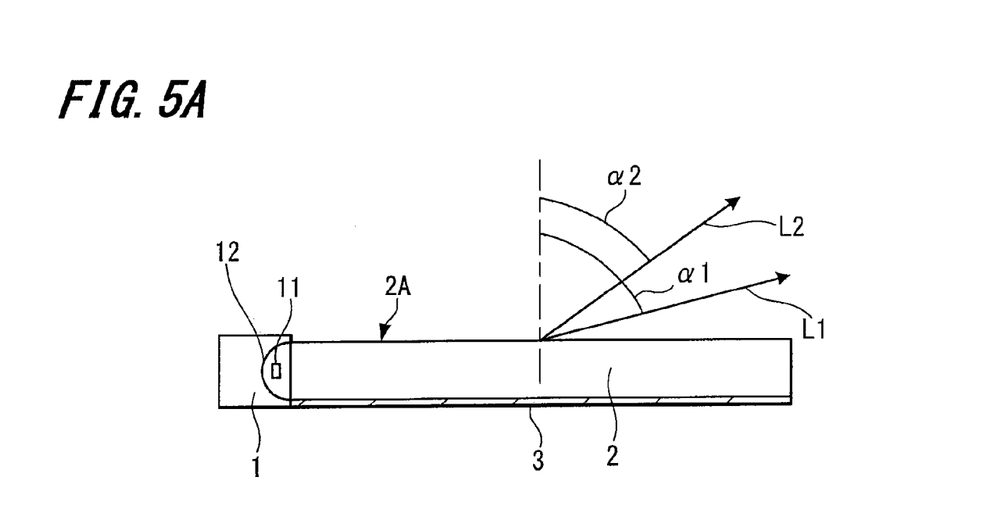
FIGS. 5A and 5B are diagrams showing an arrangement of respective surfaces of a prism shown in FIG. 4.
Figure 5B:
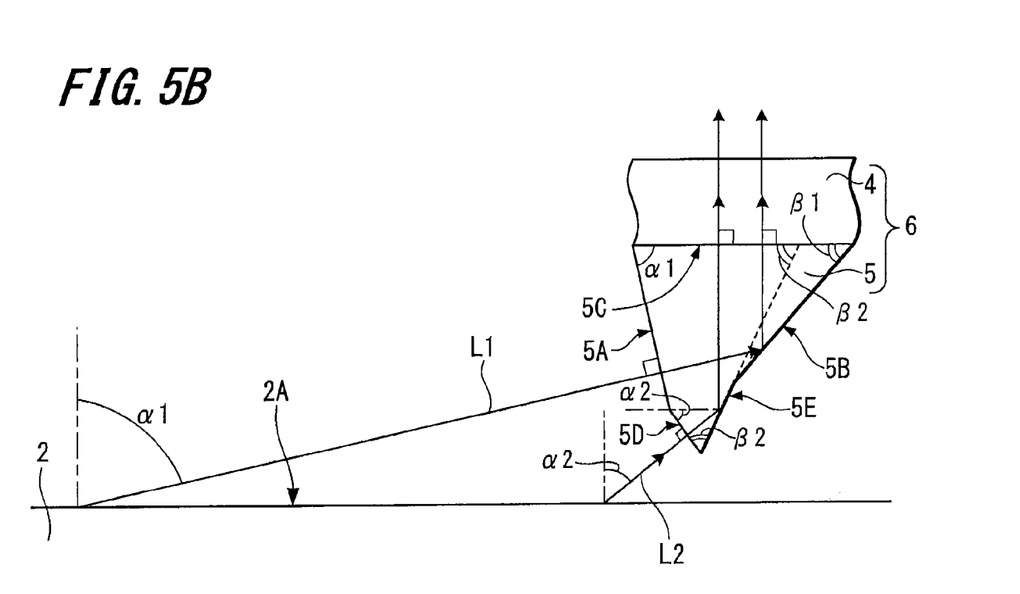

Specific arrangement of respective surfaces 5A, 5B, 5C, 5D and 5E of the prism 5 is described below with reference to FIGS. 5A and 5B. As shown in FIG. 5A, the direction of light L1 with highest luminous intensity among the light beams emitted from the top surface 2A of the light-guiding plate 2 forms an angle α1 with the normal direction of the light exit plane 2A, and the direction of light L2 with second highest luminous intensity forms an angle α2 with the normal direction of the light exit plane 2A. As shown in FIG. 5A, a relationship between α1 and α2 is represented by α1>α2. In this regard, as shown in FIG. 5B, if the first light incidence plane 5A of the prism 5 is disposed so as to form the angle α1 with the transparent sheet 4 that is a horizontal plane, then the light L1 with the highest luminous intensity can be perpendicularly incident on the first light incidence plane 5A of the prism 5. Further, if the second light incidence plane 5D of the prism 5 is disposed so as to form the angle α2 with the horizontal plane, then the light L2 with the second highest luminous intensity can be perpendicularly incident on the second light incidence plane 5D of the prism 5. Specifically, according to the embodiment, the first light incidence plane 5A of the prism 5 is disposed so as to become perpendicular to the direction of the light L1 with the highest luminous intensity, and the second incidence plane 5D is disposed so as to become perpendicular to the direction of the light L2 with the second highest luminous intensity. The light incidence planes 5A and 5D form the angles α1 and α2 respectively with the transparent sheet 4 that is the horizontal plane.

As described above, the cross-section of the prism 5 is the pentagon obtained by deforming the isosceles triangle having the above-mentioned apex angle α. Here, an angle formed with the first reflection plane 5B and the first light incidence plane 5A and an angle formed with the first reflection plane 5B and the light exit plane 5C are equal to each other, and the angle is represented by β1. Further, respective surfaces 5C, 5D and 5E of the prism 5 are disposed such that an angle formed with the second reflection plane 5E and the second light incidence plane 5D and an angle formed with the second reflection plane 5E and the light exit plane 5C are equal to each other, and the angle is represented by β2. A relationship among the angles α1, α2, β1 and β2 is represented by α1+2·β1=α2+2·β2=π, and hence the following equations (2) and (3) are obtained.

$$\beta 1=(\pi-\alpha 1)/2 \qquad (2)$$

$$\beta 2=(\pi-\alpha 2)/2 \qquad (3)$$

According to the above-mentioned arrangement, since the light L1 with the highest luminous intensity is reflected on the first reflection plane 5B with the angle of incidence and reflection angle of π/2−β1, the reflected light L1 is perpendicularly incident on the light exit plane 5C of the prism 5. Also, since the light L2 with the second highest luminous intensity is reflected on the second reflection plane 5E with the angle of incidence and reflection angle of π/2−β2, the reflected light L2 also is perpendicularly incident on the light exit plane 5C of the prism 5.

As shown in FIG. 5B, the light L1 with the highest luminous intensity is perpendicularly incident on the first light incidence plane 5A of the prism 5, reflected on the first reflection plane 5B of the prism 5 and perpendicularly incident on the light exit plane 5C of the prism 5. As a result, since the light L1 is not refracted at the boundary surfaces 5A and 5C of the prism 5 and light reflected on the boundary surfaces 5A and 5C is reduced greatly, an amount of light loss caused by the reflected light can be reduced and a sufficient amount of light can be emitted from the light exit plane 5C of the prism 5. Also, the light L2 with the second highest luminous intensity is perpendicularly incident on the second light incidence plane 5D of the prism 5, reflected on the second reflection plane 5E of the prism 5 and then perpendicularly incident on the light exit plane 5C of the prism 5. As a result, since the light L2 is not refracted at the boundary surfaces 5D and 5C of the prism 5 and light reflected on the boundary surfaces 5D and 5C is reduced greatly, an amount of light loss caused by the reflected light can be reduced and a sufficient amount of light can be emitted from the light exit plane 5C of the prism 5.

In order to set the respective surfaces 5A, 5B, 5C, 5D and 5E of the prism 5 as described above, angular intensity distribution of light emitted from the top surface 2A of the light-guiding plate 2 are measured in advance, and the exit directions of light beams with the maximum intensity and with the second highest luminous intensity are obtained for each light-guiding plate 2.

The above-mentioned light source apparatus 30 according to the embodiment includes the prism 5, the cross-section of which is the pentagon obtained by deforming an isosceles triangle, on the prism sheet 6. The prism 5 includes the first light incidence plane 5A that forms the equilateral constituting the apex angle of the isosceles triangle, the first reflection plane 5B that forms the base of the isosceles triangle and the light exit plane 5C that forms the second equilateral constituting the apex angle of the isosceles triangle. The prism is disposed such that the first light incidence plane 5A is perpendicular to the direction of the light L1 with the highest luminous intensity among the light beams emitted from the top surface 2A of the light-guiding plate 2. Hence, the light L1 with the highest luminous intensity is perpendicularly incident on the first incidence plane 5A, reflected on the first reflection plane 5B, and then incident on the exit plane 5C. Accordingly, since the light L1 with the highest luminous intensity is perpendicularly incident on the first light incidence plane 5A and the light exit plane 5C, an amount of loss of light incident on the first light incidence plane 5A and loss of light emitted from the light exit plane 5C can be reduced greatly, thereby the amount of light loss can be controlled. Therefore, an amount of light loss, in particular, loss of light reflected on the first light incidence plane 5A and the light exit plane 5C can be controlled, and brightness of light emitted from the light source apparatus 30 through the prism sheet 6 can be improved.

Also, the prism includes the second light incidence plane 5D and the second reflection plane 5E, and the angle β2 formed with the second reflection plane 5E and the light exit plane 5C is equal to the angle β2 formed with the second reflection plane 5E and the second light incidence plane 5D. The prism is disposed such that the second light incidence plane 5D is perpendicular to the direction of the light L2 with the second highest luminous intensity, and therefore the light L2 with the second highest luminous intensity is perpendicularly incident on the second light incidence plane 5D, reflected on the second reflection plane 5E and perpendicularly incident on the light exit plane 5C. Accordingly, since the light L2 with the second highest luminous intensity is perpendicularly incident on the second light incidence plane 5D and the light exit plane 5C, loss of light incident on the second light incidence plane 5D and loss of light emitted from the light exit plane 5C can be reduced greatly, thereby the amount of light loss being controlled. Then, since an amount of light loss, in particular, a loss of light reflected on the second light incidence plane 5D and on the light exit plane 5C can be controlled, brightness of light emitted from the light source apparatus 30 through the prism sheet 6 can be improved.

Since the brightness of light emitted from the light source apparatus 30 can be improved as described above, brightness equal to that of the related-art arrangement can be obtained using less energy.

Accordingly, power consumption by the light source apparatus 30 can be reduced to save energy, and a product life of the light source apparatus 30 can be extended.

The relationship between the inclination angle α1 formed between the normal of the light exit plane 2A and the direction of the light L1 with the maximum luminous intensity and the inclination angle α2 formed between the normal of the light exit plane 2A and the direction of the light L2 with the second highest luminous intensity is expressed as α1>α2 in the above-mentioned light source 30 of the embodiment.

However, a prism sheet can be formed similarly, in the case of the relationship being represented by α1<β2. If the relationship is represented by α1<β2, then the pentagon has such a shape as dented in the left-hand side that is reverse direction to the above described example shown in FIG. 5B.

While the prism sheet 6 is formed by attaching the prisms 5 to the transparent sheet 4 in the above-described embodiments, a transparent plate made of a material of similar quality may replace the transparent sheet 4. Also, according to an embodiment, instead of the transparent sheet 4, a light diffusing sheet or a light diffusing plate may be used so that a prism sheet also functions as a light diffusing sheet or light diffusing plate that is typically provided in an upper layer. With such arrangement, the directions of the light paths shown with the arrows in FIG. 2 are modified within the light diffusing sheet.

In addition, the light L1 with the highest luminous intensity and the light L2 with the second highest luminous intensity are perpendicularly incident on the boundary surfaces 5A, 5C and 5D of the prism 5 in the above-mentioned embodiments. However, the light L1 and light L2 may be approximately perpendicularly incident on the surfaces 5A, 5C and 5D of the prism 5, including the case in which the directions of the light L1 and light L2 are slightly shifted from the vertical direction. If the light L1 and light L2 are approximately perpendicularly incident on the boundary surfaces 5A, 5C and 5D of the prism 5, then loss of light reflected on the surfaces 5A, 5C and 5D can be sufficiently controlled.

The light source apparatuses according to the above-mentioned embodiments shown in FIGS. 1 to 5 can be used for an illuminating apparatus, a backlight apparatus of a color liquid-crystal display apparatus and the like.

For example, using the light source apparatus according to the embodiments for the backlight apparatus, a color liquid-crystal display apparatus can be formed, including a transmissive color liquid-crystal display panel and the backlight apparatus provided at the back side of the color liquid-crystal display panel.

In the case where the light source apparatus according to the embodiments is used for the backlight apparatus in a color liquid-crystal display apparatus, light-emitting diodes of red (R), green (G) and blue (B) are used to form the light-emitting portion 1. Subsequently, the light-emitting portion 1 is disposed at the side surface of the light-guiding plate 2. Further, the prism sheet 6 is disposed above the light-guiding plate 2, thereby forming the backlight apparatus.

With the above-mentioned light source apparatuses 10 and 30 according to the embodiments being used as the backlight apparatus to form the color liquid-crystal display apparatus, the color liquid-crystal display apparatus can be illuminated with light with sufficient brightness from the backlight apparatus formed of the light source apparatuses 10 and 30. Accordingly, images displayed on the display unit 32 of the color liquid-crystal display apparatus may have a sufficient brightness.

Also, since sufficient brightness of images can be maintained, the images can be displayed with brightness equal to that of the related-art arrangement using less energy.

Accordingly, power consumed by the color liquid-crystal display apparatus can be reduced to save energy, and a product life of the apparatus can be made long. In addition, the color liquid-crystal display apparatus may be small-sized, and costs thereof can be reduced by reducing the number of the light-emitting diodes 11.

It should be noted that, in the light source apparatus according to an embodiment, the cross-section of a polygon including 2n+1 sides can be formed by providing n light incidence planes and n reflection planes to the cross-section of the prism, corresponding to directions of n (n>3) kinds of light beams emitted from the top surface of the light-guiding plate. In such case, if the polygonal prism is configured such that the n-th light incidence plane is approximately perpendicular to light with n-th highest intensity and such that an angle formed with the n-th reflection plane and the light exit plane is equal to an angle formed with the n-th reflection plane and the n-th light incidence plane, n kinds of light can be approximately perpendicularly incident on the respective light incidence planes and the light exit plane.

The light-emitting diode (LED) 11 is used as the light source of the light-emitting portion 1 in the above-mentioned respective embodiments. However, an embodiment is not limited thereto. An embodiment can be applied to such cases of using light-emitting elements other than the light-emitting diode (for example, semiconductor lasers and other light-emitting elements) and of using a fluorescent lamp such as a cold cathode fluorescent lamp (CCFL). When a light-emitting element such as the light-emitting diode (LED) is used as a light source of a light-emitting portion, the light-emitting portion can be small-sized as compared with the case in which a fluorescent lamp is used as the light source of the light-emitting portion.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A light source apparatus comprising:
    a light-emitting portion;
    a light-guiding plate having the light-emitting portion disposed at a side surface thereof, light beams being emitted from a top surface of the light-guiding plate; and
    a light path converting sheet above the light-guiding plate, formed of a prism sheet including cylindrical prisms, a cross-section of which is a polygon obtained by deforming an isosceles triangle;
    wherein each of the prisms on the prism sheet includes at least a first light incidence plane that forms a first equilateral constituting one surface of each of the prisms associated with an apex angle of the isosceles triangle, a first reflection plane that forms a base of the isosceles triangle, and a second light incidence plane that forms one side of the polygon, a second reflection plane that forms another side of the polygon and a light exit plane that forms a second equilateral constituting another surface of each of the prisms associated with the apex angle of the isosceles triangle, an angle formed with the second reflection plane and the light exit plane being equal to an angle formed with the second reflection plane and the second light incidence plane, and
    wherein each of the prisms is disposed such that the first light incidence plane is approximately perpendicular to a direction of light beams with highest luminous intensity and that the second light incidence plane is approximately perpendicular to a direction of light beams with second highest luminous intensity, among the light beams emitted from the top surface of the light-guiding plate.

2. A light source apparatus according to claim 1, wherein the light-emitting portion includes a light-emitting diode or a fluorescent lamp.

3. A display apparatus comprising:

a display unit for displaying an image; and a light source apparatus for illuminating the display unit from a back side of said display unit, the light source apparatus including a light-emitting portion, a light-guiding plate having the light-emitting portion disposed at a side surface thereof, light beams being emitted from a top surface of the light-guiding plate, and a light path converting sheet above the light-guiding plate, formed of a prism sheet including cylindrical prisms, a cross-section of which is a polygon obtained by deforming an isosceles triangle;

wherein each of the prisms on the prism sheet includes at least a first light incidence plane that forms a first equilateral constituting one surface of each of the prisms associated with an apex angle of the isosceles triangle, a first reflection plane that forms a base of the isosceles triangle, a second light incidence plane that forms one side of the polygon, a second reflection plane that forms another side of the polygon and a light exit plane that forms a second equilateral constituting another surface of each of the prisms associated with the apex angle of the isosceles triangle, an angle formed with the second reflection plane and the light exit plane being equal to an angle formed with the second reflection plane and the second light incidence plane, and wherein each of the prisms is disposed such that the first light incidence plane is approximately perpendicular to a direction of light beams with highest luminous intensity and that the second light incidence plane is approximately perpendicular to a direction of light beams with second highest luminous intensity, among the light beams emitted from the top surface of the light-guiding plate.

* * * * *